United States Patent [19]

Barnard

[11] Patent Number: 4,819,218

[45] Date of Patent: Apr. 4, 1989

[54] QUASI-CONSTANT LINEAR-VELOCITY DISK HAVING CORRESPONDING RADII OF ADJACENT ANNULAR ZONES RELATED BY A RATIONAL NUMBER FOR DISTRIBUTING PRERECORDED INDICIA TO FORM A COHERENT WRITE CLOCK SIGNAL

[75] Inventor: James A. Barnard, Conesus, N.Y.

[73] Assignee: Eastman Kodak Company, Rochester, N.Y.

[21] Appl. No.: 943,396

[22] Filed: Dec. 19, 1986

[51] Int. Cl.$^4$ .............................................. H04N 5/76
[52] U.S. Cl. ....................................... 369/50; 369/59; 360/48
[58] Field of Search .................... 369/50, 59, 111, 275; 358/342; 360/48

[56] References Cited

U.S. PATENT DOCUMENTS

| | | | |
|---|---|---|---|
| 3,185,972 | 5/1965 | Sippel | 360/109 |
| 3,351,920 | 11/1967 | Harper et al. | 365/126 |
| 4,161,753 | 7/1979 | Bailey et al. | 358/336 |
| 4,357,635 | 11/1982 | Hasegawa | 360/51 |
| 4,486,870 | 12/1984 | Pettigrew et al. | 369/111 X |
| 4,514,771 | 4/1985 | Stark et al. | 360/73 |
| 4,519,054 | 5/1985 | Tewer | 369/59 X |
| 4,535,439 | 8/1985 | Satoh et al. | 369/275 |
| 4,561,082 | 12/1985 | Gerad et al. | 369/275 X |
| 4,638,375 | 1/1987 | Motoyama | 369/50 X |
| 4,669,077 | 5/1987 | Gerad et al. | 369/275 |

FOREIGN PATENT DOCUMENTS

| | | | |
|---|---|---|---|
| 54438 | 6/1982 | European Pat. Off. | 369/275 |
| 0080256 | 6/1983 | European Pat. Off. | |
| 2452838 | 11/1980 | France | 369/59 |
| 58-155549 | 9/1983 | Japan | 369/275 |
| 2058434 | 4/1981 | United Kingdom | 369/275 |
| 2113891 | 8/1983 | United Kingdom | |

Primary Examiner—Aristotelis M. Psitos
Attorney, Agent, or Firm—Dennis P. Monteith

[57] ABSTRACT

A disk (magnetic, magneto-optical or optical) includes information-bearing tracks having prerecorded indicia, preferably tracking pads, distributed uniformly along each track for phase locking a write clock so as to write user data subsequently between the tracking pads, in the presence of random fluctuations in disk speed. The tracks are grouped into a plurality of annular zones encircling the center of the disk, wherein the ratio of the inner radius (or outer radius) of a given zone to the corresponding radius of the adjacent inner zone is a rational number, n/d, which is the same for each adjacent pair of zones. Each track within a given zone, i, has a fixed number of radially aligned tracking pads, $P_i$, calculated from:

$$P_i = (n/d)^{i-1} \times (d)^{N-1}$$

where i is 1 for the innermost zone and is N for the outermost zone.

5 Claims, 3 Drawing Sheets

| RATIO OF CORRESPONDING RADII ($r_i/r_d$) | MINIMUM NUMBER OF INDICIA PER REVOLUTION (N=5) | | | | |
|---|---|---|---|---|---|
| | ZONE 1 | ZONE 2 | ZONE 3 | ZONE 4 | ZONE 5 |
| 5/4 | 256 | 320 | 400 | 500 | 625 |
| 6/5 | 625 | 750 | 900 | 1080 | 1296 |
| 7/6 | 1296 | 1512 | 1764 | 2058 | 2401 |

QUASI-CONSTANT LINEAR-VELOCITY DISK HAVING CORRESPONDING RADII OF ADJACENT ANNULAR ZONES RELATED BY A RATIONAL NUMBER FOR DISTRIBUTING PRERECORDED INDICIA TO FORM A COHERENT WRITE CLOCK SIGNAL

CROSS-REFERENCE TO A RELATED APPLICATION

Reference is hereby made to U.S. patent application Ser. No. 900,197 entitled Data Recording Format For An Information-Bearing Disk, by A. Syracuse, filed on Aug. 22, 1986.

BACKGROUND OF THE INVENTION

1. Field of the Invention

The present invention relates generally to digital data recording on a disk (magnetic, magneto-optical, or optical) having information-storing tracks grouped into annular zones in which the ratio of the radius of a given zone to the corresponding radius of the adjacent inner zone is a constant which is the same for each adjacent pair of zones. Thus, when the ratio of the angular speed of one zone to the speed of the adjacent outer zone is the same constant, the linear velocity of each track falls within a range which is constant from one zone to the next. More particularly, the invention relates to the distribution of prerecorded indicia on the disk for phase locking a write clock so as to write data subsequently between the indicia.

2. Description Relative to the Prior Art

With reference to the recording art, tracking is the process of keeping a transducer head on the path of a record track on a storage device. The purpose of tracking control is to adjust the position of the head relative to the record track or vice versa, so that the head is aligned with the track for maximizing the signal-to-noise ratio of a data channel.

A technique known in the prior art for tracking includes writing tracking information, hereinafter referred to as a tracking pad, at positions spaced along a record track prior to writing user data on the disk. When the tracking pads are uniformly spaced on a disk, for example, each pad functions conveniently to provide a clock synchronization pulse which serves for recording user data between adjacent tracking pads even in the presence of random fluctuations in the velocity of the disk.

Each tracking pad is distinguishable from recorded user data and thereby permits tracking control apparatus to also maintain a head on a track centerline during a playback mode. For that purpose, each tracking pad is represented by a recording pattern which is readily distinguishable from any normal delay modulation mark (DMM) or modified frequency modulation (MFM) pattern corresponding to encoded data recorded between the pads.

With a disk, however, which has record tracks grouped into a plurality of annular zones arranged according to the "ratio" method, as disclosed in the aforementioned U.S. patent application Ser. No. 900,197, the frequency of occurrence of the tracking pads during a data-writing operation is generally not an integer number per each revolution. Thus, tracking pads on any one track within any given zone do not necessarily align radially with tracking pads on other tracks in the same zone. Accordingly, when a write transducer head moves from one track to any other track in the same zone, there is a discontinuity in the phase relationship between the first tracking pad accessed when entering the "new" track and the last tracking pad encountered when leaving the "old" track. With a write clock (or read clock) phase locked to the tracking pads, a track-jump operation causes an incorrect frequency of the clock as the phase locked loop (PLL) attempts to make up for this disturbance. Until the correct frequency is reacquired, data transfer (either recording or playback) must be interrupted which, of course, is disadvantageous as it slows the average speed over which data may be transferred to and from the disk. If, on the other hand, the frequency were not corrected, user data would be written over the tracking pads, thereby potentially disrupting a subsequent tracking operation and possibly rendering user data unreadable.

SUMMARY OF THE INVENTION

In view of the foregoing, an object of the invention is to overcome the aforementioned disadvantage of a disk having multiple zones arranged according to the "ratio" method and, in so doing, provide such a disk in which prerecorded indicia, preferably tracking pads, serve to provide a coherent clock synchronization signal for recording user data between, but not on, the indicia. This object is achieved in a preferred embodiment by distributing tracking pads on the disk so that there is no discontinuity in the phase relationship from one tracking pad to the next pad as they sweep past a write head, even as the head moves from one track to any other track in the same zone. To that end the frequency at which the tracking pads sweep past the write head needs to be a fixed integer number per revolution.

For a disk having multiple zones arranged by the ratio method, the ratio of the angular speed of any given zone to the speed of the adjacent outer zone is n/d (n>d), which also describes the ratio of the inner radius (or outer radius) of any given zone to the corresponding radius of the adjacent inner zone. The length of each track (or revolution) varies linearly with its radius. Thus, for a disk having N zones, a sequence of N integer numbers must be found, corresponding respectively to the tracking pads per revolution in each successive outlying zone, with the ratio of n/d between successive numbers in the sequence.

In accordance with the preferred embodiment of the invention, the disk has multiple zones characterized in that the ratio n/d is a rational number, with each track in any given zone, i, having a fixed number of uniformly spaced radially aligned tracking pads, $P_i$, calculated from:

$$P_i = (n/d)^{i-1} \times (d)^{N-1}$$

where i is 1 for the innermost zone and is N for the outermost zone.

Since it is desired that the tracking pads take up a minimum space on the disk, the smallest set of N integer numbers for which the radio n/d holds between successive numbers is of special importance. For the smallest numbers in the sequence of N, the ratio n/d must be in lowest common denominator form.

With an integer number of tracking pads according to the aforementioned equation for $P_i$, a coherent clock synchronization signal, derived directly from the tracking pads, is maintained while tracing record tracks within any given zone, whether accessing a more outer track or a more inner track. These and other advantages of the invention will become more apparent in the detailed description of a preferred embodiment presented below.

DESCRIPTION OF THE DRAWINGS

In the detailed description of a preferred embodiment of the invention presented below, reference is made to the accompanying drawings, in which.

DETAILED DESCRIPTION OF A PREFERRED EMBODIMENT

Figure 1:
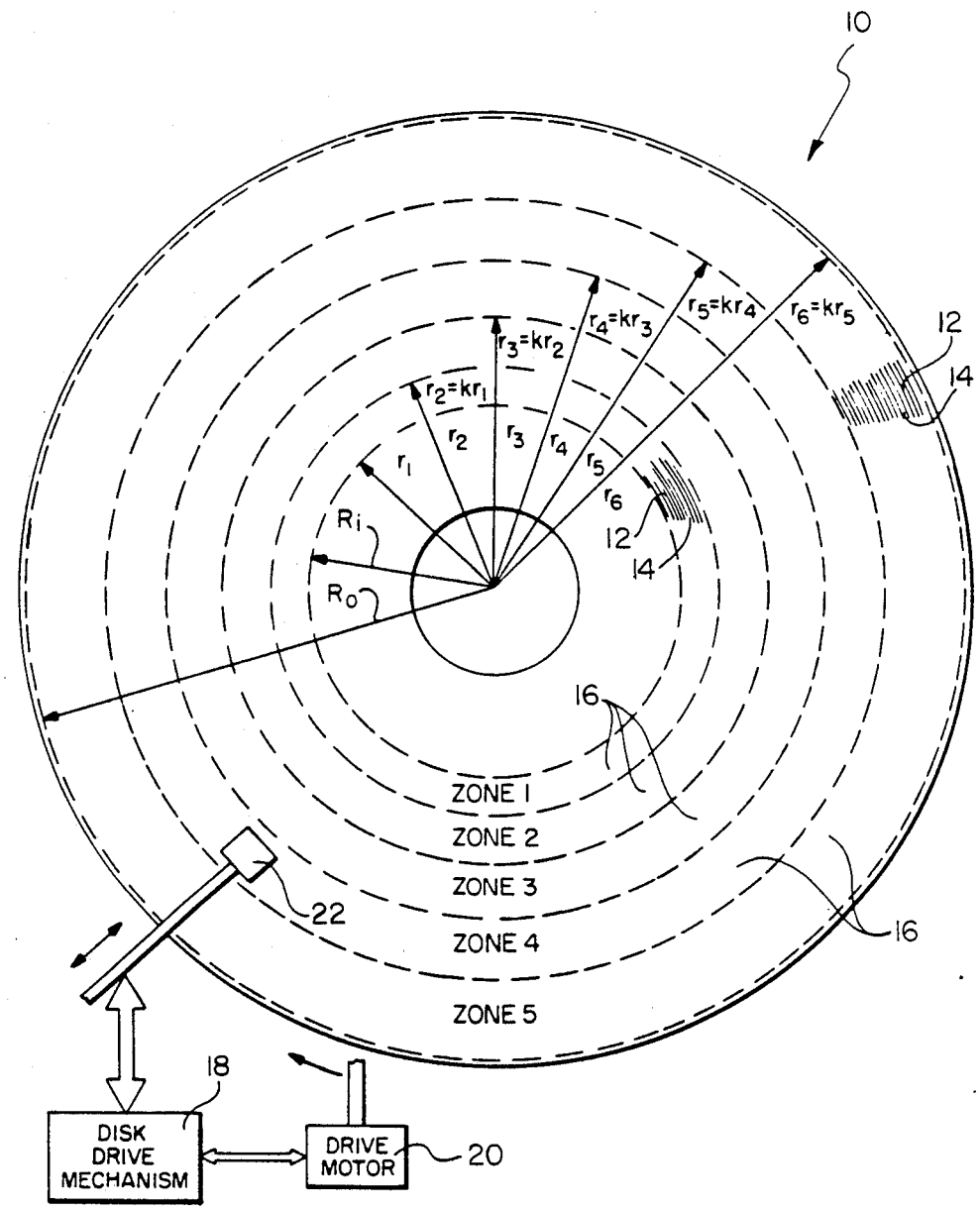
FIG. 1 is a schematic top view of a quasi-constant linear-velocity (QCLV) disk illustrating record tracks grouped into a plurality of annular zones according to the "ratio" method.

FIG. 1 shows a quasi-constant linear-velocity (QCLV) disk 10 such as is disclosed in the aforementioned U.S. patent application Ser. No. 900,197, which is assigned to the assignee of this invention and the disclosure of which is incorporated herein by reference. As taught in that patent application, equally spaced record tracks 12, each adjacent pair of which is separated by a guardband 14, are grouped into a plurality of annular zones 16 (five in FIG. 1) arranged according to the ratio method. To that end, the ratio of the radius, $r_i$, of the innermost track (or outermost track) of a given outlying zone 16 to the radius, $r_{i-1}$, of the corresponding track (innermost or outermost) of the adjacent inner zone is a constant, k, calculated from:

$$k = \sqrt[N]{Ro/Ri}$$

where, as shown in FIG. 1, $R_o$ is the outer radius of the outermost zone of the disk 10, $R_i$ is the inner radius of the innermost zone of the disk, and N is the number of disk zones.

Thus, the zones are of varying size, with the width and the number of tracks 12 of each zone 16 progressively increasing from one zone to the next outer zone.

The tracks 12 are concentric with the center of the disk 10 and, as such, may be either circular or in spiral form. A track 12 within a given zone 16 contains the same number of bits (or bit cells) per revolution as other tracks within the same zone. Because the length of each revolution is linearly proportional to its radius, bit cell density therefore decreases with increasing radius for tracks within the same zone.

For the purpose of efficiently storing information, the innermost track of each zone 16 preferably has a maximum bit cell density, permitted by the system, to maximize storage capacity from zone to zone. Thus, a track 12 from an outlying zone 16 has a greater number of bit cells than any track in a more inner zone.

To transfer information (write or read), a drive mechanism 18 causes a spindle drive motor 20 to rotate the disk 10 at a constant rotational velocity while a read/-write transducer head 22, also under the control of the drive mechanism, traces tracks radially within a given zone 16. To sustain a uniform data-transfer rate when the head 22 crosses a boundary separating one zone 16 from another zone, either toward a more outer zone or toward a more inner zone, the drive mechanism 18 makes a corresponding step change in rotational velocity. If entering the adjacent outer zone 16, the drive mechanism 18 causes the motor 20 to decrease the angular velocity of the disk 10 by an amount equal to the aforementioned ratio k; conversely, when entering the adjacent inner zone, disk angular velocity increases by the factor k.

Thus, the linear velocity of the innermost track of a given zone is equal to the linear velocity of the innermost track of any other zone; similarly, the linear velocity of the outermost track of a zone is equal to the linear velocity of the outermost track of other zones. In other words, the range of linear track velocities within a zone is a constant from zone to zone when the ratio of the angular speed of one zone to the speed of the adjacent outer zone is the aforementioned constant k. This quasi-constant linear-velocity (QCLV) effect, among other things, simplifies a recording operation as write circuitry may operate over a range of power levels that is a constant from zone to zone.

To operate a "zoned" disk for rapidly transferring user data, disk speed should be adjusted rapidly as tracks are traced from one zone to any other zone because no information can be reliably transferred until a coder/decoder channel is synchronized to the bit stream. Implicit with data transfer is that a clock synchronization signal be provided for the accurate recording and/or playing back of information in the presence of random fluctuations in the velocity of the disk 10.

An object of the invention is to employ an information-bearing disk which has multiple zones organized according to the "ratio" method and which achieves writing of user data by feeding a coherent signal—having the same period and phase—corresponding to prerecorded indicia to a phase-locked write clock. Of particular importance in that context is preventing the writing of data over preexisting indicia in the presence of fluctuations in disk speed during the data-writing operation. To that end, when tracking actuator apparatus moves radially from one track to any other track within a zone there must be no discontinuity in frequency and phase of the write clock signal if the disk is rotating at a desired speed.

For that purpose, the frequency of prerecorded indicia—the rate at which each indicia on any track sweep past the head 22 as the disk 10 rotates—needs to be a fixed integer number per revolution. To that end, the indicia per revolution must be equally spaced. Within any given zone, they must also be radially aligned.

For a disk having multiple zones arranged by the ratio method, however, the ratio of the speed of any given inner zone to the speed of the adjacent outer zone is the aforementioned constant k, which also describes the ratio of the corresponding radii of any one zone and its adjacent inner zone. In accordance with the invention, the disk 10 having N zones is characterized in that the ratio k of corresponding radii of adjacent zones is a rational number, n/d, with each track (or revolution) in any given zone, i, having a fixed number of radially aligned, uniformly spaced indicia, $P_i$, calculated from:

$$P_i = (n/d)^{i-1} \times (d)^{N-1}$$

where i is 1 for the innermost zone and is N for the outermost zone.

A more thorough understanding of the basis of $P_i$ follows from:

(1) $P_2 = (n/d) \times P_1$ where $P_1$ is the number of indicia per revolution in the innermost zone (zone 1) and $P_2$ is the number of indicia per revolution in the adjacent outer zone (zone 2).

It follows that the number of indicia per revolution for any zone, $P_i$, is calculated from:

(2) $P_i = (n/d)^{i-1} \times P_1$.

Since the indicia are equally spaced and radially aligned, there are an integer number of indicia per revolution. In other words, $P_i$ is required to be an integer for each zone i. For that condition to hold, n/d, from equation (2), must be a rational number.

It follows that $P_i$ is an integer only if $P_1/(d)^{i-1}$ is also an integer. That is, (3) $P_1/(d)^{i-1} = j$ where j is any positive integer.

Since the largest value for i is equal to the total number of zones, N, an integer number of indicia occurs per revolution when:

(4) $P_1 = j \times (d)^{N-1}$.

By substituting equation (4) into equation (2), the number of indicia per revolution is:

(5) $P_i = j \times (n/d)^{i-1} \times (d)^{N-1}$.

Since each indicium occupies a certain space on the disk, to the exclusion of data, it is highly desirable that the total number of indicia be minimized. To find the minimum number of indicium, it is necessary to find the minimum value for $P_1$ for which the other values of $P_i$ are all integers. From equation (4) the minimum value for $P_1$ occurs when j is equal to 1:

(6) $P_1 = (d)^{N-1}$

By substituting equation (6) into equation (2), the minimum number of indicia per revolution occurs when:

(7) $P_i = (n/d)^{i-1} \times (d)^{N-1}$.

Figures 2, 3:
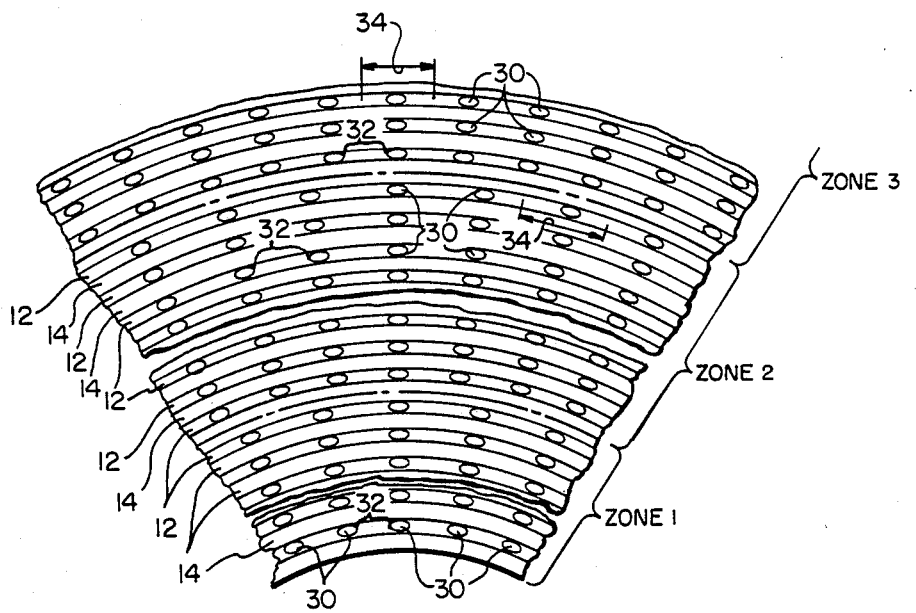
FIG. 2 shows, for a disk having five zones, the minimum number of tracking pads required per revolution, as a function of the ratio of the corresponding radii of any two adjacent zones.
FIG. 3 is an enlarged top view of a truncated pre-shaped section of the QCLV disk of FIG. 1 illustrating an arrangement of tracking pads, in accordance with the invention.

For a disk having five zones, the table of FIG. 2 shows the minimum number of indicia per revolution for various values of n/d—the ratio of corresponding radii of adjacent zones. If other than a minimum number is acceptable, an integer multiple of each set of indicia numbers, as shown by equation (5), may also be used.

In a preferred embodiment, I choose to have tracking pads, distributed in accordance with the invention, as the means for producing the aforementioned coherent write clock signal. Thus, each tracking pad serves its customary tracking control function of identifying a given track centerline; each pad also functions to provide a clock synchronizing pulse which can then be used for writing data in the presence of fluctuations in disk speed during a recording operation. Of particular importance in the latter context is preventing the writing of data over a preexisting tracking pad. For that purpose, each synchronization pulse is used for the frequency and phase control of an oscillator, which is conventionally a voltage-controlled oscillator (VCO) equipped with a phase-locked loop (PLL).

FIG. 3 is an enlarged planar view of a portion of the disk 10 showing tracking pads 30 distributed in accordance with the invention. For that purpose, each tracking pad 30 may be on a track centerline, as shown, or offset to the left or right, as is taught in U.S. Pat. No. 4,553,228. A region 32, between each pair of adjacent pads 30 on a track 12, serves for recording data. For the purpose of illustrating the invention, the tracking pads, their number and size, are not drawn to scale.

Within any given zone 16, for example zone 1, there are a fixed number—256 when the ratio (n/d) is 5/4—of equally spaced, radially aligned pads 30 per revolution. The number of tracking pads per revolution in the adjacent outer zone (zone 2) is increased by the aforementioned rational number n/d, the ratio of the corresponding radii of the two adjacent zones. Again, however, tracking pads 30 within zone 2 are also equally spaced and radially aligned. A similar relationship holds for the corresponding number of tracking pads per revolution in each of the outlying zones three through five. Since the number of tracking pads 30 per revolution increases by n/d from one zone to the adjacent outer zone and the length of each revolution increases linearly with its radius, the density of tracking pads on the innermost track 12 of each zone 16 is the same from zone to zone.

Within each zone 16, each tracking pad 30 is located at the midpoint of a track segment 34 which extends halfway to the two immediately adjacent tracking pads. In doing so, each track segment 34 within a given zone subtends a constant angle relative to the center of the disk 10. This angle decreases by the aforementioned rational number n/d from one zone to the next outlying zone. Thus, the ratio of the angle subtended by a track segment 34 in a given zone 16 to the angle subtended by a segment 34 in the adjacent outer zone is n/d.

When a given zone rotates at a desired speed, a constant tracking pad frequency (or write clock frequency) is maintained as the transducer head 22 traces tracks radially within the zone. When the head 22 crosses a boundary separating one zone 16 from another zone, either toward a more outer zone or toward a more inner zone, the drive mechanism 18 makes a corresponding step change in rotational velocity. For example, if the head 22 moves to an adjacent outer zone, the mechanism 18 reduces the speed of the disk 10 by n/d. Since there are n/d additional tracking pads per revolution in the adjacent outer zone, however, the frequency at which the tracking pads 30 sweep past the transducer head 22 stays the same once the new speed is acquired.

Each tracking pad 30 is represented by a recording pattern which is readily distinguishable from any other pattern corresponding to a recorded stream of encoded bits. To that end, each tracking pad 30 consists of a sequence of representations corresponding to a predetermined number, preferably eight (one byte), of bit cells without transitions. Thus, a tracking pad would consist of a mark eight bits long on an optical disk and flux lines emanating in the same direction from eight consecutive bit cells on a magnetic disk. Such a byte sequence is readily distinguishable from a data field normally encoded using the well known Miller DMM (or MFM) encoding technique, because the time between successive signal transitions, either MFM pulses (magnetic recording) or DMM transitions (optical recording), is normally at least one bit cell, but is normally never greater than two bit cells.

It will of course be obvious to those having skill in the art that other prerecorded information, normally associated with a disk, may serve as appropriate indicia for producing a write clock signal. For example, each track in a zone may be divided into an appropriate number of radially aligned sectors, with each sector having an encoded index pulse, or a sector address, etc., serving as an indicium for producing a coherent write clock signal.

Figure 4:
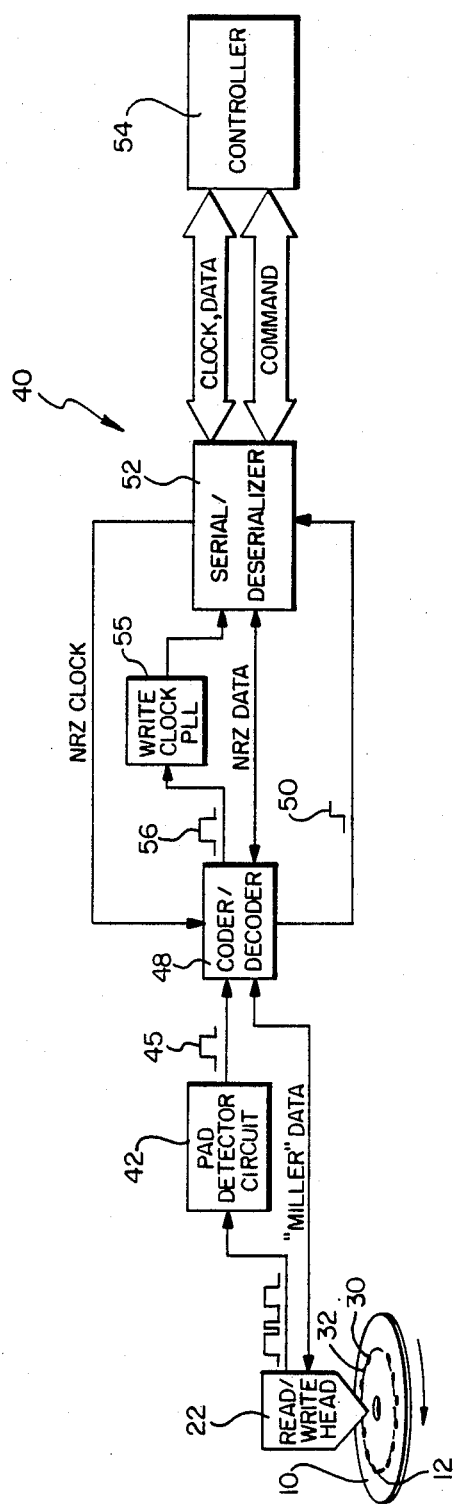
FIG. 4 is a block diagram of electronics for writing data between tracking pads prerecorded on the disk.

FIG. 4 shows, in block diagram form, exemplary circuitry 40 for writing data between equally spaced tracking pads 30 preformatted on an optical disk 10. To that end, tracking pad detector circuitry 42 accepts, from the read/write transducer head 22, a DMM signal corresponding to preformatted information read from the record track 12 being traced by the head. The preformatted information includes a sector header (not shown) and tracking pads, including one in the header, distributed in accordance with the invention throughout each sector. Because each tracking pad recorded is readily distinguishable from any Miller-encoded pattern, the circuitry 42 operates to extract tracking pad information from the signal received, and to thereby produce a tracking pad detect pulse 45 in synchronism with the reading of each tracking pad 30 on the disk 10.

In parallel with the operation of the detector circuitry 42, the head 22 feeds playback information to coder/decoder circuitry 48 which serves generally, in playback, to convert Miller-encoded DMM information recieved to non-return-to-zero (NRZ) format. In that capacity, the circuitry 48 functions, in response to a sector header, to produce an index pulse 50 which indicates the start of each sector in the track 12 being traced.

In the opposite direction of information flow, the coder/decoder circuitry 48 serves to accept NRZ user data and an NRZ clock timing signal from serial/deserializer circuitry 52 and encodes the data into DMM format for recording by the head 22 on the disk 10. To that end, the serial/deserializer circuitry 52 receives an NRZ clock signal and user data in parallel form from a controller 54. Once recording starts, the circuitry 52 sends a data stream that is sufficient to fill one full sector of a track on the disk 10. To that end, the circuitry 52 transforms the parallel data stream into serial data and loads an internal buffer which is large enough to hold one full sector of data.

So as not to write over information that has been pre-written onto the disk 10—header information and periodic tracking pads—the circuitry 52 must be able to be periodically interrupted during a write operation. To that end, the circuitry 52 maintains internal counters, based on a write clock signal, to keep track of position within a sector.

For that purpose, the counters of the circuitry 52 are initialized in response to each sector index pulse 50. The circuitry 52 then increments the counters in response to the aforementioned write clock signal, which is supplied by a write clock phase lock loop (PLL) 55. To that end, the coder/decoder circuitry 48 applies, to the PLL 55, a pad sample pulse 56, which is synchronized with the aforementioned tracking pad detect signal 45.

With the tracking pads 30 being equally spaced on any given track 12, the coder/decoder circuitry 48 produces a train of pad sample pulses 56 which would normally be equally spaced in time. With any fluctuation in the speed of the disk 10 from a desired level, however, a corresponding change in the timing of the pulses 56 occurs which, in turn, causes the PLL 55 to produce a corresponding change in its write clock signal.

The serial/deserializer circuitry 52, under the control of its internal counters, feeds a block of NRZ data in serial form to the coder/decoder circuitry 48 based on each pulse in the write clock signal that is received. In other words, data is supplied for recording as a function of the rotational speed of the track 12 being traced; the internal counters of the circuitry 52, in turn, serve to periodically interrupt the NRZ data so as not to write over the pre-written tracking sector header or any tracking pad.

ADVANTAGEOUS TECHNICAL EFFECT

From the foregoing, it is apparent to those skilled in the data recording art that the distribution of prerecorded indicia, preferably tracking pads, on a QCLV disk, in accordance with the invention, provides for phase locking a write clock so as to synchronously write data subsequently between the tracking pads. In particular, the tracking pads serve for producing, without interruption, a coherent write clock signal even as a transducer head moves from one track to another track within the same zone. In the presence of random fluctuations in the speed of the disk, the tracking pads function to cause a write clock signal to be produced that enables data to be recorded without being written over the tracking pads. Each record track may be circular or in a spiral format.

The invention has been described in detail with reference to the figures, however, it will be appreciated that variations and modifications are possible within the spirit and scope of the invention.

What is claimed is:

1. In a disk adapted for recording and playing back information-bearing binary bits at a fixed rate from information-storing tracks grouped radially into a plurality of N, greater than two, progressively wider annular zones encircling the center of said disk, the improvement wherein:

(a) the ratio of the radius of any given outlying zone to the corresponding radius of the adjacent inner zone being a fixed rational number n/d, greater than one, for each adjacent pair of zones wherein n and d are fixed integers; and
  (b) each track revolution within a given zone, i, has a fixed integer number, $P_i$, of equally spaced radially aligned uniquely identifiable indicia calculated from:

$$P_i = j \times (n/d)^{i-1} \times (d)^{N-1}$$

where j is any positive integer and i is 1 for the innermost zone and is N for the outermost zone whereby $$P_{i+1}/P_i = n/d,$$

so that when said disk is rotated at a constant angular velocity to cause the indicia to sweep past a fixed radially extending reference, a constant phase relationship is maintained at the reference between adjacent indicia in the same track and between the last indicium on any given track in a particular zone and the next indicium on any other track in the same zone.

2. A disk as defined in claim 1 wherein n/d is a rational number in lowest common denominator form.

3. A disk as defined in claim 1 wherein each indicium is a tracking pad.

4. A disk as defined in claim 1 wherein each uniquely identifiable indicium occupies a predetermined number of contiguous bit cells to define a recording pattern of a given length distinguishable from any recording pattern of information-bearing bits of the same length.

5. A disk as defined in claim 1 wherein a minimum number of indicia $P_i$ occurs on each track revolution within a particular zone when the integer j is equal to one.

* * * * *